UNITED STATES PATENT OFFICE.

JOHN JOHNSON, OF BROOKLYN, NEW YORK.

IMPROVEMENT IN RUBBER PACKING.

Specification forming part of Letters Patent No. 209,270, dated October 22, 1878; application filed June 13, 1878.

*To all whom it may concern:*

Be it known that I, JOHN JOHNSON, of Brooklyn, in the county of Kings and State of New York, have invented a new and useful Improvement in Rubber Packing, which improvement is fully set forth in the following specification.

This invention relates to that class of compounds used for steam-packing, for a certain improvement in which I obtained Letters Patent of the United States No. 199,833, dated January 29, 1878.

It is essential that the substance used for this purpose should be impervious to the action of fluid, should be somewhat yielding, so as to prevent leakage, and at the same time hard enough to bear pressure. Prior to my said patent various compounds of rubber for the purpose of packing had been devised, but the proportions of rubber and sulphur employed were such that the vulcanized compound formed thereby was of the kind known as "soft rubber," although the packing compound itself, on account of the presence of mineral matter, was more or less hard. The objection to these compounds is that after they are screwed down or otherwise put into their place the action of the steam softens them, and they then adhere to their seat, or, upon cooling off, they become brittle and flake off; also, that oil has a disintegrating effect thereon. Since the application on which my said patent was granted I have discovered that the proportions mentioned therein may be varied to an extent at that time to me unknown.

The proportions, as stated in my patent of January 29, 1878, are four ounces each of sulphur and bone-black for one pound of rubber. From my experiments subsequently I have discovered that for each pound of rubber four ounces to a pound of sulphur and three ounces to three pounds of bone-black may be used with successful results; and that the difference between hard rubber and soft rubber appears to constitute a broad distinction between my packing compounds and prior compounds containing vulcanized rubber as the binding material used for the same purpose. I have also discovered that the use of gutta-percha in connection with rubber in forming my composition works an important improvement.

This invention, therefore, consists in a composition packing containing hard rubber as a basis or binding material, and formed also of the materials in the proportions as will be hereinafter set forth.

The following description, which embodies the mode of procedure preferably employed by me, will enable those skilled in the art to make and use my invention.

I use the following ingredients in the proportions named: Rubber, one pound; bone-black, from three ounces to three pounds; sulphur, from four ounces to one pound, or sufficient to vulcanize properly into hard rubber. The proportions indicated must be followed within the limits indicated in order to furnish the desired result. If a greater or less proportion of bone-black be used the packing will not answer the purpose.

From these ingredients I make a packing to be applied to valves, pipe-joints, &c., through which steam, oil, or other destructive fluids pass. It resists the destructive action of the fluids, does not become disintegrated for an indefinite length of time, but yet is sufficiently elastic to render the valve-seat or pipe-joint perfectly tight.

By the addition of gutta-percha (generally twenty-five to fifty per cent. of the rubber) to the compound a better and more economical packing for many purposes may be obtained.

For steam-pipes I prefer the proportion of three-fourths of a pound of rubber, one-fourth of a pound of gutta-percha, two and one-half pounds bone-black, and four and one-half ounces of sulphur; and, for oil and hot-water pipes, the proportion of one pound of rubber, four ounces of bone-black, and four and one-half ounces of sulphur.

In making my packing I use the best Para rubber, because of its freedom from grit. If other rubber is used it must first be cleaned by the usual well-known methods.

I take this rubber and cut it into small strips, which I first soak in warm water until the rubber becomes soft. I then measure out the proper proportions of bone-black and sulphur, and thoroughly incorporate the three ingredients with each other by the following method: I pass the softened strips of rubber between warm rollers, heated by steam to a temperature which slightly softens the rubber, adding the other ingredients by pouring them over the rubber while it is passing through the rollers, so that they are pressed into the substance of the rubber, and this I repeat, passing the rubber, with the sulphur and bone-black, through the rollers again and again, at the same time twisting and folding the rubber, so as to present to the rollers each time a different face, covered with the sulphur and bone-black, until the three have become thoroughly incorporated with each other. I then roll the mass between other warm rollers into plates of the desired thickness. From these plates the packing is cut in the desired form by any convenient method.

The next step is the vulcanization. For this purpose the washers are placed in iron molds, made of suitable size, with flanges extending upward the thickness of the washer, and with a central perforation corresponding to the hole to be left in the washer. The molds, with the washers in them, are then placed on top of one another, so that the bottom of each mold serves as a cover for the one below it, and a rod of the diameter of hole in these washers, with one end secured in an iron plate, is then passed through the molds and washers. An iron plate is placed on the top mold, and the whole is secured firmly together by a nut on the end of the rod. The washers are then vulcanized at from 295° to 300° Fahrenheit. This operation takes eight hours, or thereabout, when the packing is ready for use.

Having thus described my invention, what I claim, and desire to secure by Letters Patent, is—

1. A composition packing consisting of refractory substances, such as bone-black and a binding material of rubber and sulphur, the proportion of the latter being substantially in excess of twenty-five per cent. of the former, vulcanized to form hard rubber, as described.

2. A composition for packing consisting of rubber and sulphur, in the proportion to form hard rubber when vulcanized, and bone-black in the proportion substantially greater than twenty-five per cent. of the rubber, as set forth.

3. A composition of rubber, and sulphur, and bone-black, both the latter being in the proportion substantially in excess of twenty-five per cent of the rubber, as set forth.

In testimony whereof I have signed this specification in the presence of two subscribing witnesses.

JOHN JOHNSON.

Witnesses:
JOHN P. KINGSFORD,
ALEX. CAMERON.